Dec. 26, 1950     R. R. WOODS     2,535,884
BROOM CORN CUTTER
Filed June 15, 1949     7 Sheets-Sheet 1
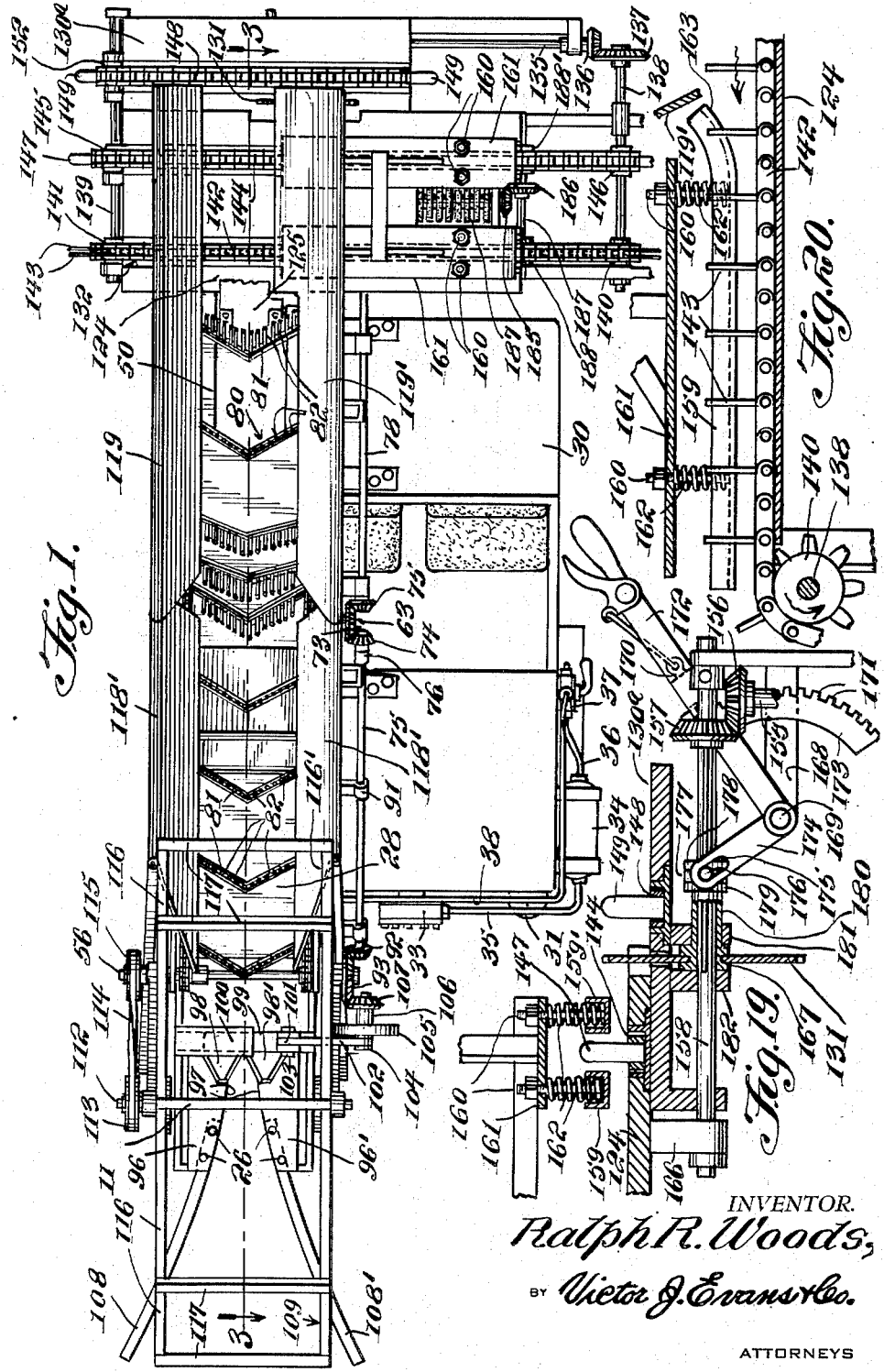
INVENTOR.
Ralph R. Woods,
BY Victor J. Evans & Co.
ATTORNEYS

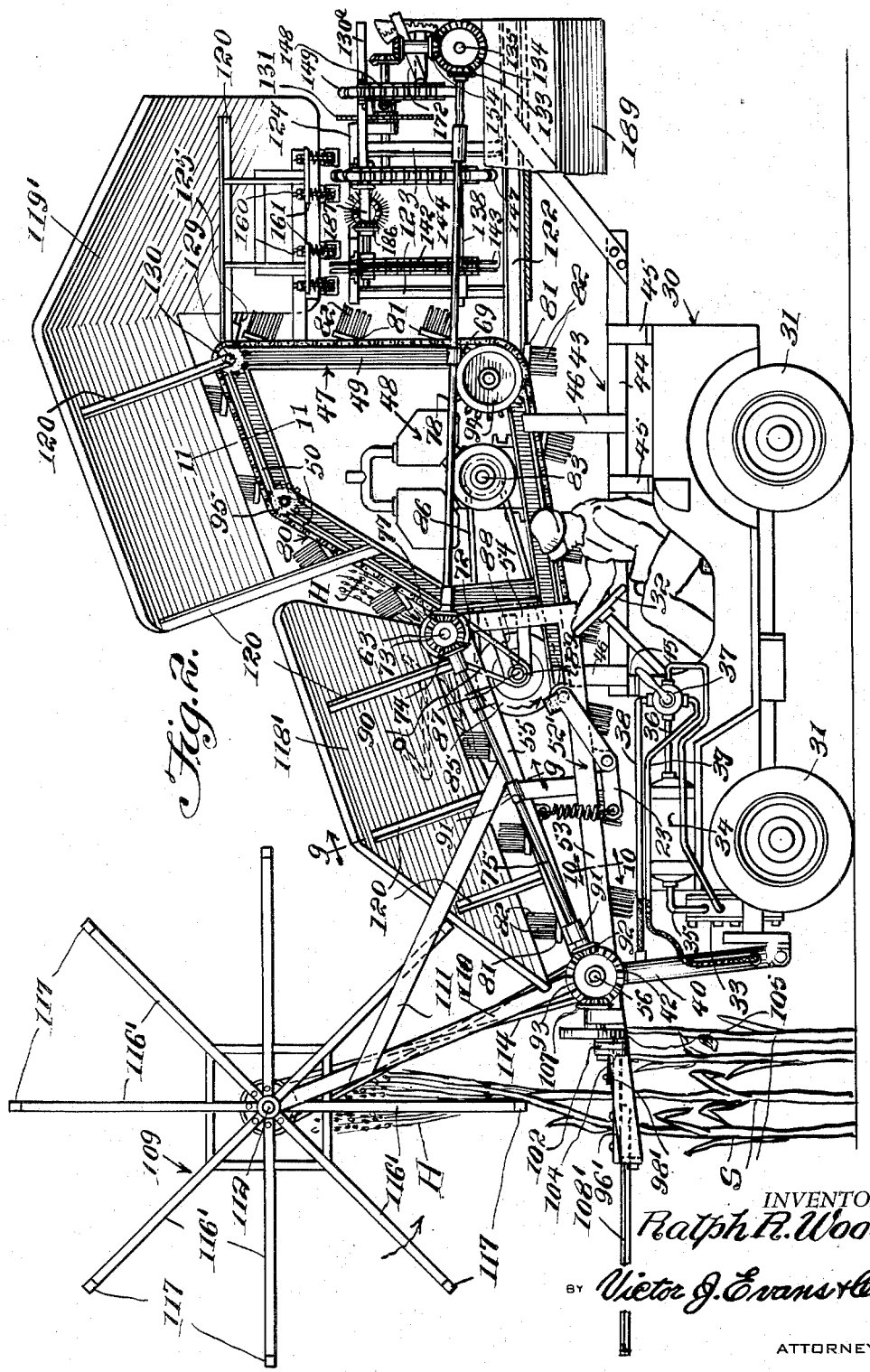

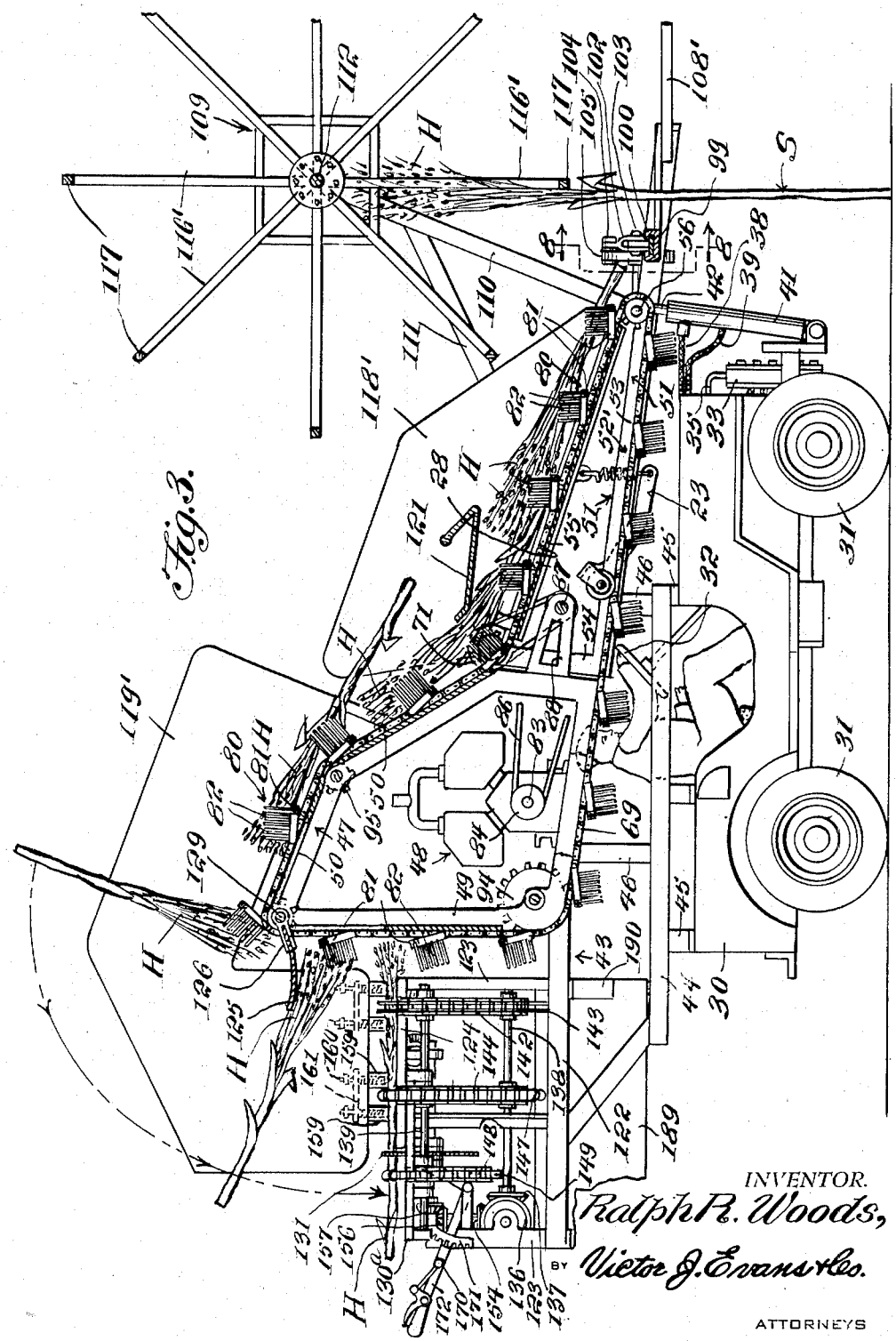

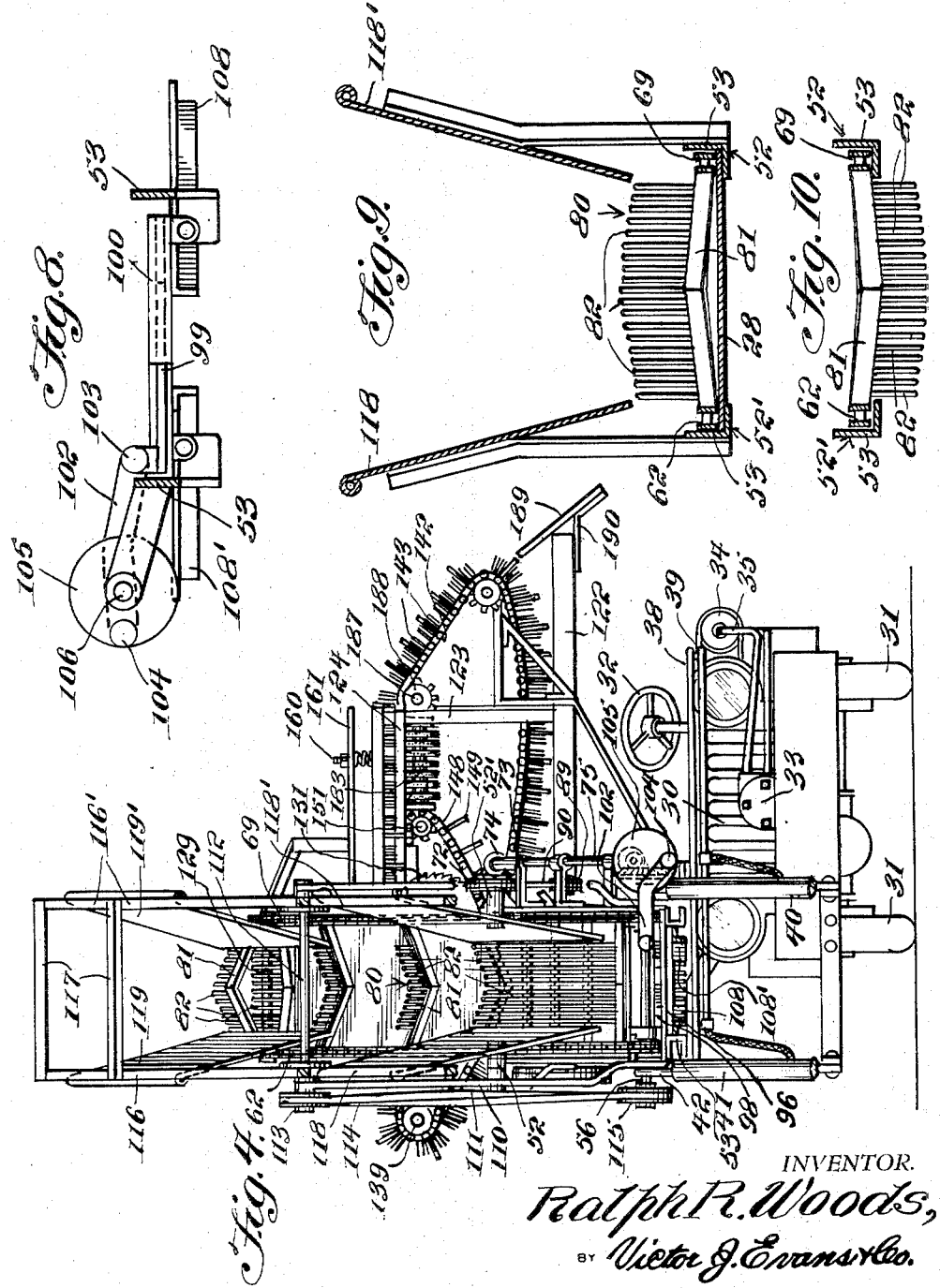

Dec. 26, 1950 R. R. WOODS 2,535,884
BROOM CORN CUTTER
Filed June 15, 1949 7 Sheets-Sheet 5
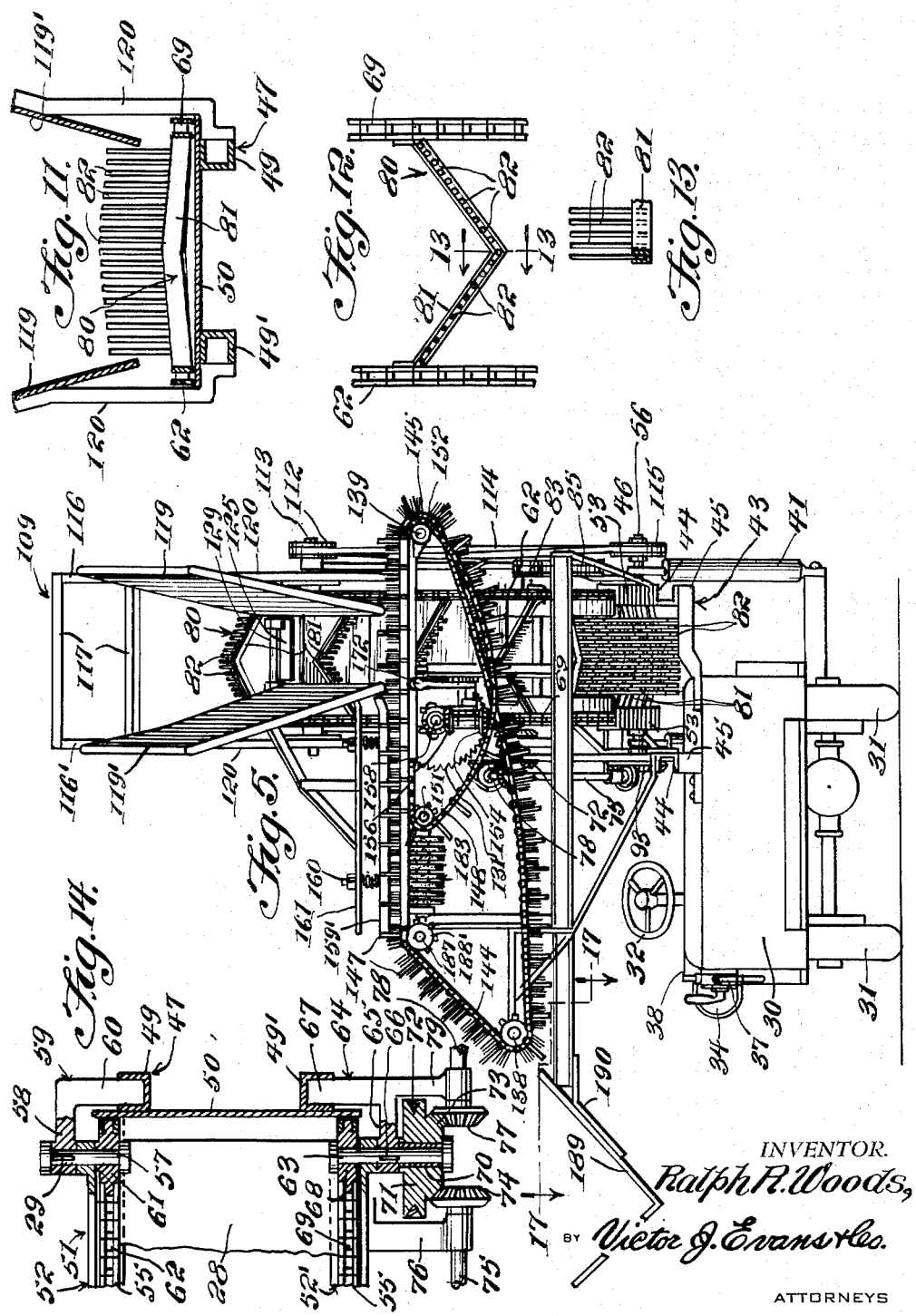
INVENTOR.
Ralph R. Woods,
BY Victor J. Evans & Co.
ATTORNEYS

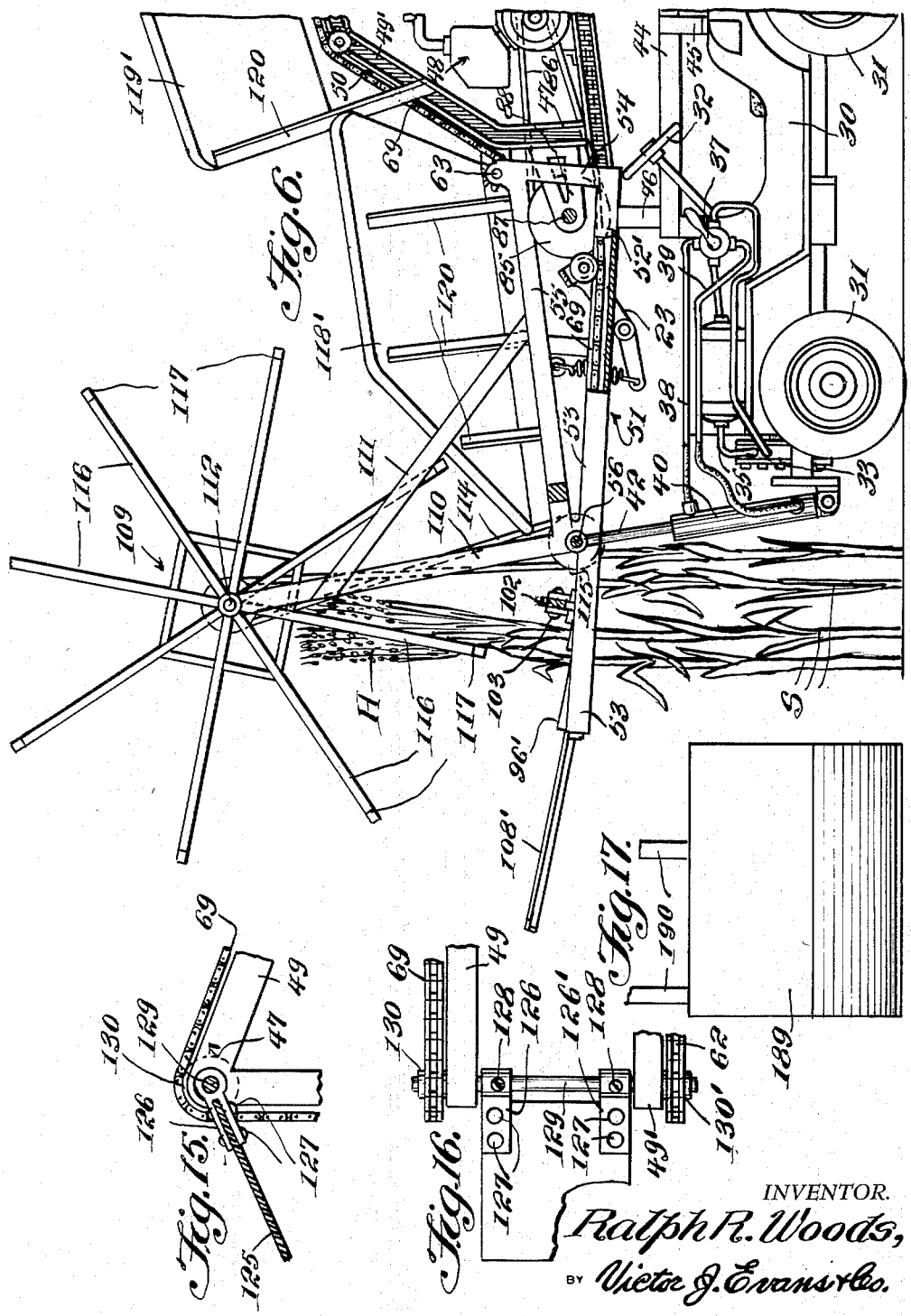

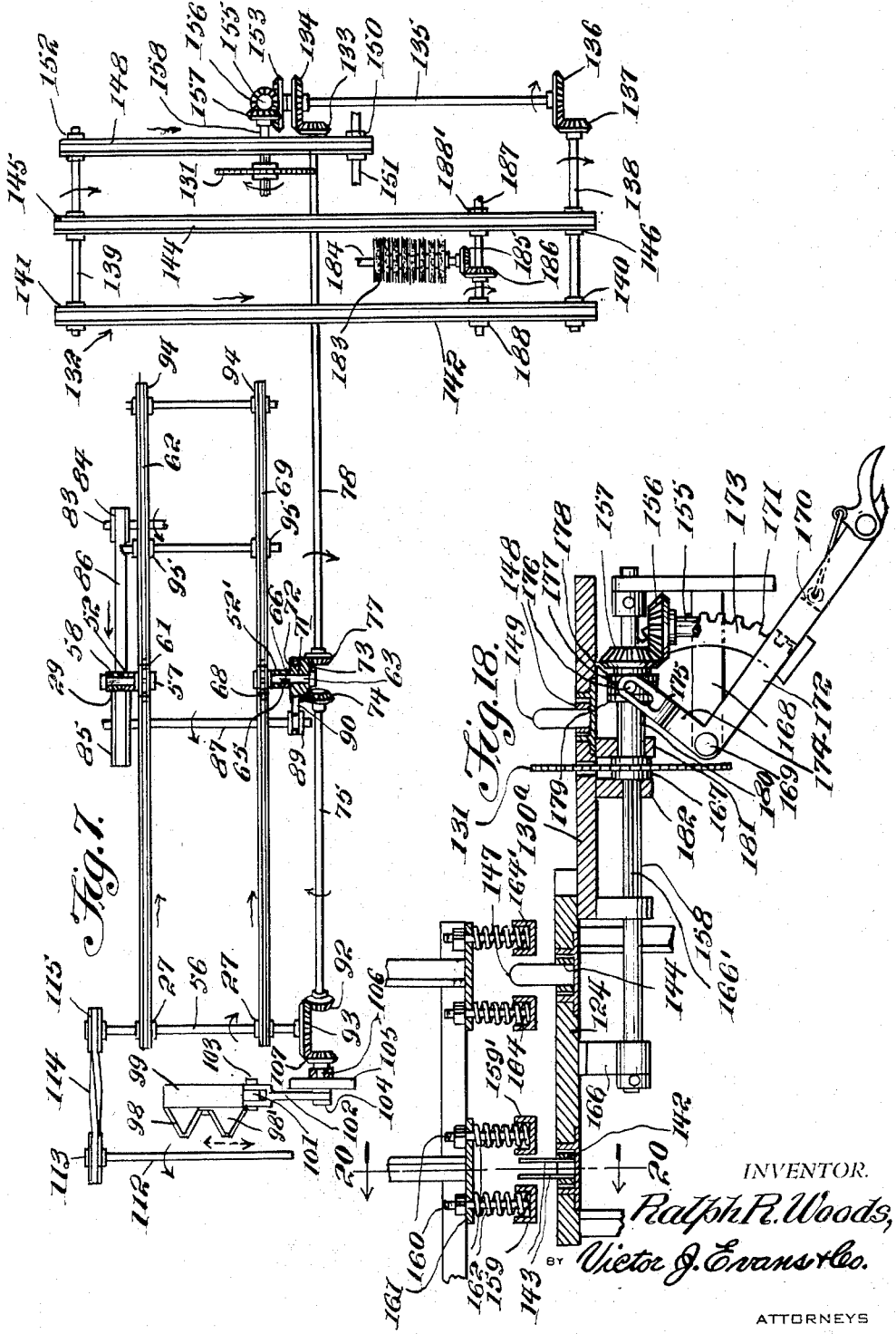

Patented Dec. 26, 1950

2,535,884

UNITED STATES PATENT OFFICE 2,535,884

BROOM CORN CUTTER

Ralph R. Woods, Springfield, Colo.

Application June 15, 1949, Serial No. 99,332

5 Claims. (Cl. 56—17)

This invention relates to agricultural equipment and more particularly to a machine for harvesting broom corn.

The object of the invention is to provide a machine which will harvest the brush heads or tops from broom corn stalks growing in rows in a field.

Another object of the invention is to provide a broom corn harvesting machine, which when moved through the field will gather in and cut the tops of the standing stalks, trim the severed tops or heads to a uniform length, strip leaves and seeds from the severed tops, and finally, deposit the stripped tops in a suitable receiving trough.

Still another object of the invention is to provide a broom corn harvesting machine which includes a gathering and cutting mechanism that can be adjusted in order to cut broom corn of various heights.

A further object of the invention is to provide a broom corn harvesting machine which is constructed so that the harvested tops or brush heads will be of uniform length regardless of the length of the stalks growing in the field.

A further object of the invention is to provide a broom corn harvesting machine which, when moved across a field of growing corn, will gather in the stalks, cut the tops or heads from the stalks, even the cut heads, convey the cut heads rearwardly along the machine, trim the heads to a desired length, strip the leaves and seeds from the cutting edge, and deposit the stripped heads in a receiving trough.

Other objects and advantages will be apparent during the course of the following description.

In the accompanying drawings, forming a part of this application, and in which like numerals are used to designate like parts throughout the same:

Figure 1 is a fragmentary top plan view of the corn harvesting machine, according to the present invention;

Figure 2 is a side elevational view of the machine, with parts broken away and in section;

Figure 3 is a sectional view taken on the line 3—3 of Figure 1;

Figure 4 is a front elevational view of the machine;

Figure 5 is a rear elevational view of the machine;

Figure 6 is a fragmentary side elevational view, showing the front of the machine elevated for cutting long stalks;

Figure 7 is a diagrammatic view of the drive mechanism for the machine;

Figure 8 is an enlarged sectional view taken on the line 8—8 of Figure 3;

Figure 9 is an enlarged sectional view taken on the line 9—9 of Figure 2;

Figure 10 is an enlarged sectional view taken on the line 10—10 of Figure 2;

Figure 11 is an enlarged sectional view taken on the line 11—11 of Figure 2;

Figure 12 is a top plan view of the portion of the conveyor shown in Figure 11;

Figure 13 is a sectional view taken on the line 13—13 of Figure 12;

Figure 14 is a sectional view showing the hinge connection between the front and rear frames;

Figure 15 is a fragmentary side elevational view of the rear frame, showing the kicker, the kicker being shown in section;

Figure 16 is a top plan view of the mechanism of Figure 15;

Figure 17 is a top plan view of the receiving carrier or trough;

Figure 18 is a sectional view through the mechanism for trimming the cut heads, the mechanism being set so as to provide a finished head of long length;

Figure 19 is a view similar to Figure 18, but with the trimming mechanism set for trimming short length brush heads; and Figure 20 is a sectional view taken on the line 20—20 of Figure 18.

Referring in detail to the drawings, the numeral 30 designates a conventional vehicle on which the apparatus is supported and the vehicle 30 is provided with the usual rubber tired wheels 31 and a steering wheel 32. Supported on the front of the vehicle 30 is a hydraulic pump 33, Figures 2 and 4, and the pump 33 circulates hydraulic fluid through the hydraulic system. A tank 34 is connected to the pump 33 by a suitable conduit 35, and a line or conduit 36 connects the tank 34 to the manually controlled valve 37. Suitable conduits 38 and 39 connect the valve 37 to a pair of vertically disposed spaced parallel lifts 40 and 41, the lifts 40 and 41 being hydraulically actuated.

Each of the lifts 40 and 41 are provided with a vertically movable piston rod 42 whereby upon actuation of the lifts 40 and 41, the front of the harvesting machine can be raised or lowered in order to cut stalks of various heights as described later in this application.

Extending longitudinally along one side of the vehicle 30 and secured to the rear thereof is a framework 43 which includes horizontally disposed beams 44 and a plurality of vertically disposed uprights 45 have their upper ends secured to the beams 44 and their lower ends secured to the vehicle 30.

Projecting upwardly from the beams 44 and secured thereto, as by welding, is a plurality of spaced parallel vertically disposed uprights 46 which are secured to the lower portion of a stationary frame 47. The frame 47 is preferably fabricated of channel shaped beams as best seen in Figures 2 and 11. A power source, such as a gasoline driven motor 48 is arranged adjacent the frame 47, and the motor 48 serves to operate the harvesting machine as later described. The frame 47 includes a pair of spaced parallel sections 49 and 49' which have extending therebetween and secured thereto, a plate 50 which prevents the brush heads H from falling onto the vehicle 30.

Arranged above the front part of the vehicle 30 is a movable frame 51 which is mounted for pivotal movement about a horizontal axis. The movable frame 51 includes a pair of spaced parallel vertically disposed sections 52 and 52' which are preferably fabricated of angle iron. Each of the sections 52 and 52' includes a lower beam 53, a vertically disposed beam 54, and an upper beam 55 which extends between the beams 53 and 54 and is secured thereto. Extending between the sections 52 and 52' and rotatably supported by the latter is a horizontally disposed shaft 56 and the upper ends of the piston rods 42 are rotatably connected to the shaft 56. Thus, upon actuation of the hydraulic lifts 40 and 41, the front of the frame 51 can be raised or lowered as desired.

A hinged connection is provided between the meeting ends of the moveable frame 51 and the stationary frame 47 and this hinge connection is shown in detail in Figure 14. The hinge connection includes a first short shaft 57 which extends through the upper rear portion of the section 52 of the frame 51, and the shaft 57 also projects through an arm 58 of an L-shaped tie rod 59. The other arm 60 of the tie rod 59 is secured to the section 49 of the stationary frame 47. The shaft 57 is keyed to the arm 58 as at 29, Figure 14. A sprocket 61 is loosely mounted on the shaft 57 and an endless chain 62 is trained over the sprocket 61 for a purpose to be later described. The hinge connection further includes a second shaft 63 which projects rotatably through the other section 52' of the frame 51. A tie rod 64 has a transverse arm 65 keyed to the shaft 63 as at 66, and one end 67 of the tie rod 64 is secured to the section 49' of the stationary frame 47. A sprocket 68 is loosely mounted on the shaft 63 and a chain 69 is trained over the sprocket 68. Also arranged on the shaft 63 is a bearing sleeve 70 which rotatably supports a transmission wheel 71. The transmission wheel 71 is shaped to define a pulley 72 and also a gear 73 is formed on the wheel 71. The gear 73 is arranged in meshing engagement with a bevel gear 74 which is mounted on an end of a shaft 75, the shaft 75 being rotatably supported by a bearing bracket 76. A bevel gear 77 is also arranged in meshing engagement with the bevel gear 73, and the bevel gear 77 is mounted on an end of a shaft 78, the shaft 78 being rotatably supported by a bearing arm 79 which is part of the tie rod 64. Thus, upon actuation of the hydraulic lifts 40 and 41, the frame 51 will be pivoted about an axis extending through the shaft 57 and 63.

A conveyor means is provided for carrying the severed tops or brush heads H through the machine, and this conveyor means includes the pair of endless chains 62 and 69 which are trained around the frames 47 and 51, as best seen in Figures 2 and 3. The conveyor is designated generally by the numeral 80 and includes a plurality of support members 81 arranged in spaced parallel relation with respect to each other. The ends of the support members 81 are secured, as by welding, to the chains 62 and 69 and carried by each of the support members 81 is a plurality of spaced parallel wire fingers 82 which engage the tops or brush heads H, after they have been severed from the stalks, S. A plate 28 extends between the upper beams 55 of the sections 52 and 52' so that the possibility of any material falling onto the vehicle 30 or the operator thereof is precluded.

Referring to Figure 7, there is shown a diagrammatic view of the driving mechanism for the broom corn harvesting machine. Thus, the gasoline engine 48 drives a shaft 83 and mounted on the shaft 83 is a pulley 84, there being a pulley 85 spaced from the pulley 84. A belt 86 is trained over the pulleys 84 and 85. The pulley 85 is mounted on a drive shaft 87, the drive shaft 87 being rotatably supported by bearing brackets 88. Mounted on the other end of the drive shaft 87 is a pulley 89 and a belt 90 is trained over the pulley 89 and over the pulley 72 so that rotation of the drive shaft 87 causes the pulley 72 to rotate. Since the gear 73 is formed integral with the pulley 72, rotation of the pulley 72 will cause the shaft 75 to rotate and also the shaft 78 will be rotated.

The shaft 75 extends along one side of the frame 51 and suitable bearing brackets 91 coact with the bearing 76 to rotatably support the shaft 75 on the frame 51. A bevel gear 92 is mounted on the front end of the shaft 75 and the bevel gear 92 is arranged in meshing engagement with a bevel gear 93 that is arranged on the adjacent end of the shaft 56. Thus, as the shaft 75 rotates, the shaft 56 will likewise be rotated. A pair of sprockets 27 are mounted on the shaft 56 and the chains 62 and 69 are trained over the sprockets 27 so that the endless chains 62 and 69 will be caused to travel whereby the support members 81 will move thus conveying the severed brush heads H through the machine. The chains 62 and 69 are also trained over suitable sprockets 94 and 95 which are rotatably supported in the stationary frame 47.

A cutting mechanism is provided for severing the tops or brush heads H from the stalks S, Figures 2, 3, 5 and 6, as the vehicle 30 moves along the rows of growing stalks. This cutting mechanism is arranged at the front end of the machine and embodies a pair of stationary ledger plates 96 and 96' which are each provided with a sharp edge 97. Coacting with the ledger plates 96 and 96' to shear the heads H from the stalks is a pair of reciprocating cutting knives or blades 98 and 98'. The rear ends of the knives 98 and 98' are secured to a body member 99 and the body member 99 is slidably arranged in a stationary guide sleeve 100, the knives 98 and 98' projecting through a slot in the front of the sleeve 100. The body member 99 is provided with an ear 101 which is positioned between the bifurcated end of a pitman 102, and a pin 103 pivotally connects the ear 101 to the pitman 102.

The other end of the pitman 102 is pivotally connected to a pin 104 which is eccentrically mounted on a disc 105 and the disc 105 is secured to a shaft 106. Mounted on the shaft 106 is a bevel gear 107 which meshes with the bevel gear 93. Thus, rotation of the shaft 75 causes the shaft 56 to rotate and this in turn imparts a reciprocating movement to the cutting knives 98 and 98' so that the brush heads H of the stalks S will be severed as the machine moves along the field.

A means is provided for guiding the stalks S into proper position so that they will be cut by the reciprocating knives 98 and 98'. Thus, a pair of arms or bars 108 and 108' are arranged so that their front ends diverge whereby the growing stalks will be guided into the cutting mechanism as the machine moves. The inner ends of the arms 108 and 108' are secured to the under surface of the ledger plates 96 and 96' by suitable securing elements, such as rivets 26, Figure 1.

Arranged above the cutting mechanism is a rotary reel which is designated generally by the numeral 109. The rotary reel 109 serves to urge the stalks S into engagement with the cutting mechanism to insure that the brush heads H will be cut from the stalks S. The reel 109 is supported by uprights 110 and braces 111 which each have their lower ends secured to the moveable frame 51. A horizontally disposed shaft 112 is rotatably supported by the uprights 110. Mounted on one end of the shaft 112 is a pulley 113 and a belt 114 is trained over the pulley 113 and is also trained over a pulley 115 which is mounted on an end of the shaft 56. The reel 109 further includes a plurality of radially extending arms 116 and 116' which have cross pieces 117 extending therebetween, the inner ends of the arms being connected to the shaft 112.

Arranged above the moveable frame 51 is a pair of spaced inclined sideboards 118 and 118', and arranged above and supported on the stationary frame 47 is a pair of spaced inclined sideboards 119 and 119', there being suitable braces 120 secured to the sideboards and to the frames for maintaining the sideboards in their proper spaced position. The sideboards 118, 118', 119, and 119' help guide the brush heads H through the machine and insure that none of the brush heads being conveyed by the conveyor 80 will fall off into the vehicle below.

After the brush heads have been severed from the stalks S by the cutting mechanism, the heads H are gripped by the fingers 82 and at this time the brush heads are arranged irregularly and are lying haphazardly on the conveyor 80. It is necessary that the upper ends of the heads must be arranged in alignment in order to insure that the heads will have uniform length after the trimming operation. This is accomplished by means of a plate member 121 which extends between the sideboards 118 and 118' and is pivoted thereto. Thus, as the brush heads H are conveyed upwardly and rearwardly by the conveyor 80, the plate member 121 causes tension or pressure to be applied to the heads whereby the fingers 82 will grip a plurality of the heads in such a manner that the upper ends of the brush heads will be even or aligned.

The framework 43 further includes horizontally disposed beams 122 and projecting upwardly from the beam 102 is a plurality of spaced parallel vertically disposed uprights or standards 123, the standards 123 supporting a horizontally disposed stationary table 124. The table 124 receives the brush heads H after they have been conveyed rearwardly by the conveyer 80. A means is provided for causing the brush heads to become disengaged from the fingers 82 whereby the brush heads H will lie flat on the table 124. This means comprises a kicker 125 which is fabricated of a resilient material, such as rubber, and the kicker 125 is mounted on a shaft 129 by means of a plurality of brackets 126 and 126', Figures 15 and 16. Suitable securing elements, such as rivets 127 project through the brackets 126 and 126' and into the kicker 125 while set screws 128 connect the brackets to the shaft 129. Suitable sprockets 130 and 130' are arranged on each end of the shaft 129 and the chains 62 and 69 are trained over the sprockets 25 and 25'. Thus, the shaft 129 is continuously rotated and the kicker 125 is timed so that as the brush heads H reach the position just above the table 124 as shown in Figure 3, the kicker 125 will contact the brush heads H and disengage the heads from the fingers 82.

A horizontally disposed platform 130a is mounted for sliding movement beneath the table 124 and as the platform 130a moves, it moves therewith a rotary saw 131 which serves to trim the brush heads H to any desired length, depending upon the position of the platform 130a.

A means is provided for conveying the brush heads H along the table 124 and past the saw 131 so that the brush heads will be trimmed by the saw. This means comprises a conveyer 132 and the conveyer 132 is driven or operated by the motor 48. Thus, there is provided a bevel gear 133 on the rear end of the shaft 78 and the bevel gear 133 meshes with a bevel gear 134 which is mounted on a horizontally disposed shaft 135. Mounted on the other end of the shaft 135 is a bevel gear 136 and the bevel gear 136 meshes with a bevel gear 137 which is mounted on the rear end of a shaft 138. Suitable bearings are provided for rotatably supporting the shafts 135 and 138. Arranged in spaced parallel relation with respect to the shaft 138 is a shaft 139 and mounted on one end of the shaft 138 is a sprocket 140. A sprocket 141 is mounted on the corresponding end of the shaft 139 and a chain 142 is trained between the sprockets 140 and 141. Secured to the chain 142 is a plurality of spaced wire fingers 143 which grip the seed carrying portion of the brush heads H after the brush heads H have been deposited on the table 124. The conveyer 132 further includes a chain 144 which is trained between a sprocket 145 that is mounted on the shaft 139 and is also trained over a sprocket 146 that is mounted on the shaft 138. The chain 144 carries a plurality of fingers 147 which grip the brush heads H along with the fingers 143 to move the brush heads past the saw 131.

The conveyer 132 further includes a chain 148 that carries a plurality of spaced fingers 149 which grip a portion of the brush heads H. The chain 148 is trained over a sprocket 150 which is mounted on a shaft 151. The chain 148 is also trained over a sprocket 152 and the sprocket 152 is keyed to the shaft 139. Thus, rotation of the shaft 139 causes the sprocket 152 to rotate to thereby drive the chain 148. The sprocket 152 is keyed to the shaft 139 and the sprocket 152 can slide along the shaft 139 as the platform 130a is moved towards and away from the table 124.

For rotating the saw 131, a bevel gear 153 is mounted on one end of the shaft 135. The bevel gear 153 is arranged in meshing engagement with a bevel gear 154 which is mounted on the lower end of a short shaft 155 and secured to the upper end of the shaft 155 is a bevel gear 156. The gear 156 is arranged in meshing engagement with a gear 157, and the gear 157 is secured to a shaft 158, the saw 131 being mounted for longitudinal movement on the shaft 158. Thus, the shaft 78 rotates, the shaft 135 is also rotated, and this in turn drives the shaft 158 to thereby rotate the saw 131 and the brush heads H can be trimmed to any desired length, depending upon the relative position of the saw 131 with respect to the table 124.

A means is provided for causing the brush heads H to lie flat as they are conveyed along the table, to insure proper trimming by the saw 131. Thus, a pair of spring pressed feet 159 and 159' extend longitudinally along the table 124 and the presser feet 159 and 159' are spaced just above the table. The presser feet 159 and 159' are secured to the lower end of a plurality of bolts 160 and the upper ends of the bolts 160 project through a horizontally disposed cross bar 161, the cross bar 161 being secured to the frame 47 by suitable bracing. A coil spring 162 is circumposed on each of the bolts 160 whereby a slight pressure is exerted against the brush heads H. One end of each of the presser feet 159 and 159' is curved or shaped arcuately as at 163 to facilitate the movement of the brush heads to a position therebelow, after the heads have left the conveyer 80. The pair of presser feet 159 and 159' are arranged in spaced parallel relation above the chain 142 and a similar pair of spring pressed presser feet 164 and 164' are arranged above the chain 144.

A manually operable adjusting means is provided for shifting the platform 130a whereby the saw 131 can be moved in order to trim the brush heads H to any desired length. Further since the saw 131 can be moved, there will be an assurance that the machine will operate when long or short stalks of grown corn are being processed through the machine. This adjusting means is connected to the horizontally disposed shaft 158 which is rotatably supported by a bearing block 165 that is secured to the undersurface of the table 124. The rear portion of the shaft 158 which is rotatably supported by the bearing block 166, is provided with a keyway 165' and the hub 167 of the saw 131 is arranged in engagement with the keyway 166' so that as the shaft 158 rotates the saw 131 will also be rotated. A bracket 168 has a pin 169 pivotally connecting an arm 172 thereto, and the arm 172 carries a manually operable keeper or pawl 170 which is adapted to be moved into engagement with one of the teeth 171 in a sector plate 173 for maintaining the saw 131 or platform 130 immobile in their adjusted position, Figures 18 and 19. A link 174 is secured to the arm 172 and the link 174 is provided with a slot 175 which receives therein a pin 176 that projects from a collar 177, the collar 177 being rotatably mounted on the shaft 158. The collar 177 is interposed between a flange 178 which is secured to the shaft 158 and a second flange 179 which is arranged on an end of a sleeve 180, the sleeve 180 being mounted on the shaft 158. The hub 167 is interposed between a pair of ears 181 and 182 which are secured to the undersurface of the platform 130. Thus, upon pivotal movement of the arm 172, the hub 167 which carries the saw 131 will be moved longitudinally along the shaft 158 and also the platform 130a will be moved.

After the brush heads H have been trimmed to their proper length by the saw 131, the brush heads are conveyed past a plurality of revolving wire brushes 183. The brushes 183 are mounted on a shaft 184 and mounted on one end of the shaft 184 is a bevel gear 185 meshing with a bevel gear 186. The gear 186 is mounted on a shaft 187 and the shaft 187 has secured thereto a pair of sprockets 188 and 188' which are arranged in meshing engagement with the chains 142 and 144 whereby the brushes 183 are revolved as the shaft 78 rotates. The wire brush 183 serve to strip seeds and leaves from the brush heads after the heads have been trimmed.

After the brush heads H have been trimmed and stripped of their leaves and seeds, they are conveyed by the conveyer 132 to a trough or carrier 189, the carrier 189 having a substantially V-shape and being supported on braces 190 which project from the frame work 43.

The operation of my device is as follows:

The vehicle 30 is driven through the field of growing broom corn stalks S with the operator sitting in the position shown in Figures 2 and 3. The motor 48 drives the shaft 83 and the shaft 83, through the belt 86, causes the shaft 87 to rotate. This results in the shaft 75 being rotated since the belt 90 connects the pulley 89 to the pulley 72. Rotation of the shaft 75 causes the knives 98 and 98' to reciprocate and the knives coact with the ledger plates 96 and 96' to shear therebetween the brush heads or tops H from the corn stalks S. The rotary reel 109 is driven by a belt 114 which is trained over a pulley 115 that is mounted on the shaft 56. The rotating reel 109 forces the stalks to be moved through the space between the arms 108 and 108' and into engagement with the cutting knives and ledger plates. After the heads H have been severed by the cutting mechanism, the heads H are deposited on the conveyer 80 and the fingers 82 grip the brush heads and start to move the brush heads upwardly and rearwardly through the machine. At this time, the brush heads are lying on the conveyer in an irregular manner but as the brush heads pass below the plate member 121 pressure is applied to the brush heads so that the upper ends of the brush heads become aligned on the conveyer. The brush heads are conveyed further to the rear and upwardly by the conveyer 80 and finally as shown in Figure 3, as each bundle of brush heads H passes beyond the frame 47, the kicker 25 moves to disengage the bundle of heads from the fingers 82 and the brush heads are deposited on the table 124.

Next, the conveyer 132 grips the brush heads H and moves the brush heads into engagement with the rotating saw 131, whereupon the lower or butt ends of the brush heads H are trimmed by the saw. The trimmed ends are discarded and the remaining portion of the brush heads are carried by the fingers 147 and 143 over the revolving wire brushes 183, and the wire brushes 183 serve to remove or strip any leaves or seeds from the brush heads H. After the leaves and seeds have been stripped from the brush heads, the fingers 147 and 143 of the conveyer 132 carry the brush heads over and drop the brush heads into the carrier 189 and the brush heads may be emptied from the carrier or trough 189 in any desired manner.

The machine is so constructed that the front portion thereof can be raised or lowered when it is desired to sever the heads from stalks of various lengths. Thus, to raise or lower the front portion of the machine, the hydraulic lifts 40 and 41 are actuated whereupon the rods 42 are moved vertically. Thus, in Figure 2, the front of the machine is shown in a lowered position when short stalks are being cut, while in Figure 6, the front of the machine is shown in raised position for severing brush heads from tall stalks. This movement of the apparatus from the position of Figure 2 to the position of Figure 6 is accomplished by actuating the lifts 40 and 41 whereupon the rods 42 move upwardly and as the rods 42 move upwardly the frame 51 will pivot about the shafts 57 and 63. Further, as the frame 51 pivots, it carries the rotary reel 109 to the proper position. The apparatus further includes a chain tightener 23 which maintains the chains 62 and 69 under proper tension.

Also, the saw 131 may be positioned so that the brush heads H are trimmed to any desired length. Thus, referring to Figures 18 and 19, the saw is shown in two different positions, as for trimming brush heads to different lengths. Thus, in Figure 19 the saw 131 is shown in position for trimming brush heads of a relatively short length, while in Figure 18, the saw 131 is shown arranged for trimming brush heads having a long stem or length. To move the saw 131 from the position of Figure 18 to the position of Figure 19, the operator releases the keeper 171 from the sector plate 173 and then raises the arm 172. This raising or pivotal movement of the arm 172 causes a counterclockwise pivotal movement of the link 174 and this results in the sleeve 180 being moved longitudinally along the shaft 158. As the sleeve 180 moves, it moves the hub 167 so that the platform 130a slides beneath the table 124 and thus the saw 131 moves toward the table 124. The keeper 170 and sector plate 173 coact to maintain the saw immobile in its various adjusted positions.

What I claim:

1. In a broom corn harvesting machine, the combination with a power operated vehicle, hydraulic lifts mounted on the front of said vehicle, of a first movable frame supported by the front of said vehicle and mounted for pivotal movement about a horizontal axis, a second frame disposed above the rear of said vehicle and connected to said first frame, said hydraulic lifts being connected to said first frame whereby actuation of said lifts causes a pivotal movement of said first frame, a pair of diverging arms projecting forwardly from said first frame for gathering in the corn stalks, a cutting mechanism connected to the front of said first frame for severing the heads of said stalks, a rotary reel supported by said first frame for moving said stalks into engagement with said cutting mechanism, an endless conveyor mounted on said frames for carrying the severed heads through the machine, a pair of spaced inclined sideboards supported by each said first frames for preventing the severed heads from accidentally falling off said conveyor, a horizontally disposed stationary table disposed rearwardly of said second frame and secured thereto, a platform slidably connected to said table, a rotary saw carried by said platform, a conveyor mounted on said table for receiving the severed heads from said conveyor and carrying the heads into engagement with said saw whereby said heads are trimmed to a uniform length, and a trough for receiving therein the cut heads.

2. In a broom corn harvesting machine, the combination with a power operated vehicle, hydraulic lifts mounted on the front of said vehicle, of a first movable frame supported by the front of said vehicle and mounted for pivotal movement about a horizontal axis, a second frame disposed above the rear of said vehicle and connected to said first frame, said hydraulic lifts being connected to said first frame whereby actuation of said lifts causes a pivotal movement of said first frame, a pair of diverging arms projecting forwardly from said first frame for gathering in the corn stalks, a cutting mechanism connected to the front of said first frame for severing the heads of said stalks, a rotary reel supported by said first frame for moving said stalks into engagement with said cutting mechanism, an endless conveyor mounted on said frames for carrying the severed heads through the machine, a pair of spaced inclined sideboards supported by each said first frames for preventing the severed heads from accidentally falling off said conveyor, a horizontally disposed stationary table disposed rearwardly of said second frame and secured thereto, a platform slidably connected to said table, a rotary saw carried by said platform, a conveyor mounted on said table for receiving the severed heads from said conveyor and carrying the heads into engagement with said saw whereby said heads are trimmed to a uniform length, manually operable means for moving said platform whereby said saw can be adjusted to trim the heads to a desired length, and a trough for receiving therein the trimmed heads.

3. In a broom corn harvesting machine, the combination with a power operated vehicle, hydraulic lifts mounted on the front of said vehicle, of a first movable frame supported by the front of said vehicle and mounted for pivotal movement about a horizontal axis, a second frame disposed above the rear of said vehicle and connected to said first frame, said hydraulic lifts being connected to said first frame whereby actuation of said lifts causes a pivotal movement of said first frame, a pair of diverging arms projecting forwardly from said first frame for gathering in the corn stalks, a cutting mechanism connected to the front of said first frame for severing the heads of said stalks, a rotary reel supported by said first frame for moving said stalks into engagement with said cutting mechanism, an endless conveyor mounted on said frames for carrying the severed heads through the machine, a pair of spaced inclined sideboards supported by each said first frames for preventing the severed heads from accidentally falling off said conveyor, a horizontally disposed stationary table disposed rearwardly of said second frame and secured thereto, a platform slidably connected to said table, a rotary saw carried by said platform, a conveyor mounted on said table for receiving the severed heads from said conveyor and carrying the heads into engagement with said saw whereby said heads are trimmed to a uniform length, manually operable means for moving said platform whereby said saw can be adjusted to trim the heads to a desired length, a trough for receiving therein the trimmed heads, and a plurality of revolving brushes for stripping leaves and seeds from the trimmed heads.

4. In a broom corn harvesting machine, the combination with a power operated vehicle, hydraulic lifts mounted on the front of said vehicle, of a first movable frame supported by the front of said vehicle and mounted for pivotal movement about a horizontal axis, a second frame disposed above the rear of said vehicle and connected to said first frame, said hydraulic lift being connected to said first frame whereby actuation of said lift causes a pivotal movement of said first frame, means for gathering in the corn stalks, a cutting mechanism connected to the front of said first frame for severing the heads of said stalks, means supported by said first frame for moving said stalks into engagement with said cutting mechanism, an endless conveyor mounted on said frame for carrying the severed heads through the machine, a pair of spaced inclined side boards supported by said first frame for preventing the severed heads from accidentally falling off said conveyor, a table disposed rearwardly of said second frame and secured thereto, a platform slidably connected to said table, a rotary saw carried by said platform, a conveyor mounted on said table for receiving the severed heads from said conveyor and carrying the heads into engagement with said saw whereby said heads are trimmed to a uniform length, and a trough for receiving therein the cut heads.

5. In a broom corn harvesting machine, the combination with a power operated vehicle, hydraulic lifts mounted on the front of said vehicle, of a first movable frame supported by the front of said vehicle and mounted for pivotal movement about a horizontal axis, a second frame disposed above the rear of said vehicle and connected to said first frame, said hydraulic lifts being connected to said first frame whereby actuation of said lifts causes a pivotal movement of said first frame, means for gathering in the corn stalks, a cutting mechanism connected to the front of said first frame for severing the heads of said stalks, means supported by said first frame for moving said stalks into engagement with said cutting mechanism, an endless conveyor mounted on said frames for carrying the severed head through the machine, side boards supported by said first frame for preventing the severed heads from accidentally falling off said conveyor, a table disposed rearwardly of said second frame and secured thereto, a platform slidably connected to said table, a saw carried by said platform, and a conveyor mounted on said table for receiving the severed heads from said conveyor and carrying the heads into engagement with said saw whereby said heads are trimmed to a uniform length.

RALPH R. WOODS.

REFERENCES CITED

The following references are of record in the file of this patent:

UNITED STATES PATENTS

| Number | Name | Date |
|---|---|---|
| 860,499 | Stafford | July 16, 1907 |
| 1,591,675 | Fullerton | July 6, 1926 |
| 1,710,610 | Duncan | Apr. 23, 1929 |
| 2,281,904 | Wurtele | May 5, 1942 |